United States Patent Office 3,449,317
Patented June 10, 1969

1

3,449,317
FIBRE-REACTIVE AZO DYESTUFFS
René de Montmollin, Riehen, Switzerland, assignor to Ciba Limited, Basel, Switzerland, a Swiss confederation
No Drawing. Filed Nov. 16, 1965, Ser. No. 508,139
Claims priority, application Switzerland, Dec. 1, 1964, 15,505/64
Int. Cl. C09b 62/40, 62/50, 62/70
U.S. Cl. 260—161                                    7 Claims

---

ABSTRACT OF THE DISCLOSURE

Fibre-reactive azo dyestuffs of the formula (1)

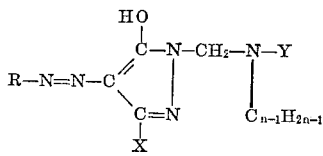

in which R represents the residue of a diazo component that may contain an azo group, which diazo component contains a carboxylic acid group or sulphonic acid group, X represents a low-molecular weight alkyl group, a carboxyl or aryl group or a functionally modified carboxyl group, especially a carboxylic acid ester grouping bound through its —CO group, Y represents an aliphatic fibre-reactive acyl residue and $n$ represents a positive integer not greater than 7 are suitable for dyeing nitrogen-containing fibrous material, having a very high affinity for said materials, providing level dyeings of desirable fastness to washing, milling and light.

---

It is known that fibre-reactive dyestuffs can be manufactured by acylaminomethylation, according to Tscherniac and Einhorn, with hydroxymethylamides of aliphatic fatty acids or according to Cherbuliez with N-halogenated methylcarboxylic amides. In these processes, the introduction of halogenated fatty acid amidomethyl groups into the organic dyestuffs is effected by reaction with N-mehylol compounds of α- and β-halogenated fatty acid amides under appropriate conditions, as described, for example, by A. Einhorn (Liebigs Annalen der Chemie, 343, page 207 [1905], and 361, page 113 [1908]).

It is also known that in this reaction the acylaminomethyl group is exchanged for a replaceable hydrogen atom in an aromatic nucleus, and that the more nucleophilic the aromatic nuclei of the dyestuff to be reacted are under the reaction conditions, the easier the condensation with the methylol compounds proceeds and the greater the yields. Accordingly, the acylaminomethylation can be assisted by suitable nucleophilic substituents of the aromatic residue and the position in which the carboxylic amidomethyl groups are to be introduced may be determined.

The present invention is based on the surprising observation that acylaminomethyl groups can be introduced not only into aromatic rings, but also into heterocyclic rings, namely, in 1-position of a 4-azo-5-pyrazolone. Accordingly, the present invention provides fibre-reactive azo dyestuffs of the formula (1)

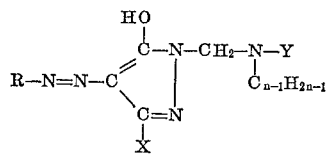

in which R represents the residue of a diazo component that may contain an azo group, which diazo component contains a carboxylic acid group or sulphonic acid group, X represents a low-molecular weight alkyl group, a carboxyl or aryl group or a functionally modified carboxyl group, especially a carboxylic acid ester grouping bound through its —CO group, Y represents an aliphatic fibre-reactive acyl residue and $n$ represents a positive integer not greater than 7.

The fibre-reactive acyl residues represented by the symbol Y may be sulphonic acid derivatives or preferably carboxylic acid derivatives. As examples, there may be mentioned linear residues of up to 3 carbon atoms including both saturated residues, for example, β-sulphatoethanesulphonyl, β-chloropropionyl, β-bromopropionyl, α,β-dibromopropionyl and chloracetyl residues, and unsaturated residues, for example, vinylsulphonyl, chloracrylic, bromacrylic dichloracrylic, chlorocrotonyl or acrylic residues, and residues of the formula

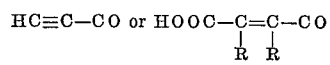

in which one of the two symbols R represents a hydrogen atom and the other represents a chlorine atom.

The dyestuffs of the invention can be prepared from the corresponding azo dyestuffs of the formula (2)

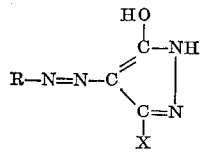

in which R and X have the meanings given above, by reaction with N-methylol compounds of alpihatic acid amides in which the acyl residues are fibre-reactive, or by reaction with functional derivatives of the said methylol compounds which react in the same manner as the methylol compounds.

The starting dyestuffs of the Formula 2 are obtainable by coupling diazo compounds that may contain azo groups with 5-pyrazolones unsubstituted in 1-position, for example, 3-methyl-5-pyrazolone, 3-phenyl-5-pyrazolone, 5-pyrazolone-3-carboxylic acid, 5-pyrazolone-3-carboxylic acid-N,N-dialkylamides, 5-pyrazolone-3-carboxylic acid-methyl-, ethyl-, isopropyl-, phenyl- or cyclohexyl-esters.

The following are examples of amines which may be diazotised and coupled with the 5-pyrazolones indicated: aminoazobenzene monosulphonic acid and disulphonic acid, 1-aminobenzene-2-, 3- or 4-sulphonic acid, 1-aminobenzene-3- or 4-carboxylic acid, 1-aminobenzene-2-5,-disulphonic acid, 4-amino-1-methoxybenzene-2-sulphonic acid, 2-amino-1-methoxybenzene-4-sulphonic acid, 3-amino-6-hydroxybenzoic acid-5-sulphonic acid, 5-acetylamino-2-aminobenzene-1-sulphonic acid, 4-acetylamino-2-aminobenzene-1-sulphonic acid, 5-acetylamino- or 5-benzoylamino-2-aminobenzene-1-carboxylic acid, 1-aminonaphthalene-4-, 5-, 6- or 7-sulphonic acid, 2-aminonaphthalene-4-, 6-, 7- or 8-sulphonic acid, 2-aminonaphthalene-1-sulphonic acid, 1-aminonaphthalene - 3,6 - disulphonic acid, 2-aminonaphthalene-1,5-disulphonic acid, 2-aminonaphthalene - 3,6 - 4,8, 5,7- or 6,8 - disulphonic acid, 1- and 2-aminonaphthalene-trisulphonic acids, 1-(3'- or 4'-aminobenzoyl) - aminobenzene-3-sulphonic acid, 3-aminopyrene-8- or 10-monosulphonic acid, 3-aminopyrene-5,8- or 5,10-disulphonic acid, 4-nitro-4'-aminostilbene-2,2'-disulphonic acid, the amines of the formula

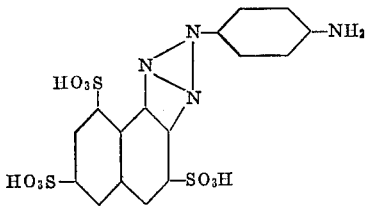

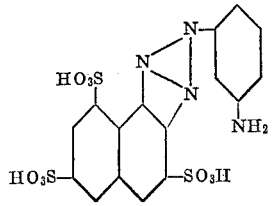

and

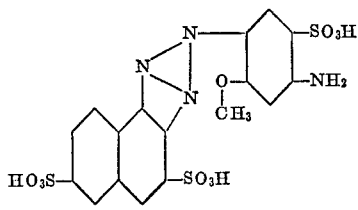

dehydrothiotoluidine sulphonic acid, as well as amines that lead to metallizable dyestuffs, for example, 2-aminobenzoic acid-4- or 5-sulphonic acid, 4-chloro-2-aminophenol-6-sulphonic acid, 6-chloro, 6-nitro or 6-acetylamino-2-aminophenol-4-sulphonic acid, 2-aminophenol-4- or 5-sulphonic acid, and also amines that can be tetrazotized, for example, meta- or para-phenylene diamine mono-sulphonic acid or disulphonic acid, benzidine-mono- or di-sulphonic acids, which lead to symmetrical or asymmetrical disazo dyestuffs, depending on whether identical or different pyrazolones of the kind defined are used for coupling.

When the amines, whose diazo compounds are used in the preparation of the starting dyestuffs of the Formula 2, contain a complex metal forming group in a position vicinal to the amino group, for example, a carboxyl, hydroxyl or alkoxy group, for example, a methoxy group, the dyestuffs of the Formula 2 obtained can be converted into heavy-metal complex compounds, for example, into copper, chromium, nickel or cobalt complex compounds, after condensation. The new copper-containing monoazo dyestuffs may also be prepared by metallization of the corresponding metal-free monohydroxyazo dyestuffs by coppering under oxidizing conditions.

It is advantageous to choose diazo compounds obtained from amines free from nucleophilic substituents, because otherwise a correspondingly greater amount of methylol compound has to be used in order to ensure that complete acylamidomethylation is effected at the 1-position of the pyrazolone ring.

The N-methylolamides used as reactants in the process of the present invention are obtained by additively combining formaldehyde with α- or β-halogenated fatty acid amides or with unsaturated aliphatic acid amides with the assistance of basic condensing agents, for example, potassium carbonate, or with the assistance of a mineral acid under mild conditions. In the present process, it is principally the N-methylol compounds of monochloracetamide, monobromacetamide, α-bromopropionic acid amide, β-chloro- and β-bromopropionic acid amide, α,β-dichloropropionic acid amide, acrylamide, chloracrylamide, bromacrylamide, chlorocrotonic acid amide and the like, that are used.

Condensation of the dyestuffs with the methylol compounds is carried out in the presence of acidic condensing agents or dehydrating agents that react as such. Compounds of the kind defined are primarily concentrated hydrochloric acid, zinc chloride, phosphoric anhydride, acetic anhydride, syrupy phosphoric acid, aluminium chloride-pyridine mixtures and oleum but, the preferred condensing agent is concentrated to anhydrous sulphuric acid, because in most cases it can also serve as solvent for the reactants. The temperature at which the reaction is carried out can vary within wide limits and depends primarily on the kind of condensing agent or dyestuff used. In the concentrated sulphuric acid the reaction generally proceeds speedily to completion at room temperatures (15 to 30° C.). In some cases it is necessary to perform the reaction at an elevated temperature, for example, at 40 to 80° C., especially when a plurality of carboxyamidomethyl groups are to be introduced. However, this applies only when the reactants are not destroyed under these conditions and when a possible sulphonation of the reaction product is not undesirable. The finished reaction products are precipitated by pouring the sulphuric acid solutions or suspensions into ice-water and then isolated in the usual manner.

The N-methylol amides may be replaced by reactive functional derivatives thereof, provided the said derivatives react in the same manner. Suitable substances are, for example, the esters obtained by treating the methylol compounds with inorganic or organic acids or acid halides or anhydrides, and also di-(fatty acid amidomethyl)-ethers obtained by autocondensation in the presence of, for example, phosphorus oxychloride. However, since these functional derivatives have to be prepared from the methylol compounds, preference is given to the first process. In some cases, however, where the Einhorn method produces unsatisfactory results it is possible to achieve the desired effect with these derivatives, especially with the N-chloromethylamides. In some cases it is possible to simplify the process of the invention by reacting a mixture of formaldehyde and the acid amide with the dyestuff in a single-step process instead of starting from the prepared methylol derivatives of the amides.

A modification of the process for preparing the dyestuffs consists in dissolving an acid amide in concentrated sulphuric acid, adding a dihalogenated dimethyl ether to the solution and treating the appropriate dyestuff in this reaction mixture at 15 to 30° C. Isolation of the acylamidomethylated dyestuff is effected in the manner described above.

The dyestuffs of the invention, which contain an unsaturated acyl residue, for example, an acrylic, chloracrylic or bromacrylic residue, can also be prepared from the corresponding halogenated fatty acid derivatives, for example, from dyestuffs that contain a β-chloropropionyl, α,β-dichloropropionyl or α,β-dibromopropionyl residue, by elimination of hydrogen halide by means of an agent having an alkaline reaction.

The dyestuffs obtainable by the process of the invention, especially those containing not more than two acidic groups imparting solubility in water, are suitable for dyeing nitrogen-containing fibrous materials, for example, leather, silk, polyamides and polyurethanes, and especially wool. They yield very level dyeings on these fibres when applied from an aqueous acidic bath. Many of these dyestuffs, provided they contain not more than one sulphonic acid group, display a very high affinity for the said nitrogen-containing materials in a slightly acid to neutral bath and thus exhaust extremely well. The dyeings obtained therewith, especially dyeings on wool, are level and display a very good fastness to washing and milling, especially alkaline milling. In many cases, the dyeings also exhibit a good fastness to light.

The dyestuffs suitable for dyeing cellulosic materials are, in particular, those containing two to four sulphonic acid groups per dyestuff molecule. They are suitable for dyeing cellulose materials by the so-called pad-dyeing process in which the material to be dyed is impregnated with an aqueous dyestuff solution which may contain a salt and the dyestuff is fixed on the substratum by treatment with an alkali, preferably with the application of heat. This process and the direct dyeing process by which many of the disazo dyestuffs obtainable by the process of the invention can also be applied yield dyeings which, as a rule, are distinguished by a good fastness to light and especially by excellent properties of wet fastness.

Valuable and fast prints are also obtainable on cellulosic fibres when the dyestuffs are fixed on the printed material by a heat treatment in the presence of an alkali.

Subsequent to the dyeing or printing process it is advantageous to remove any unfixed dyestuff as completely as possible. For this purpose the dyeings or prints are rinsed thoroughly in warm water and cold water and then subjected to a soaping process in the presence of a non-ionic dispersing and/or wetting agent.

The following examples illustrate the invention. Unless otherwise stated, the parts and percentages are by weight.

EXAMPLE 1

34 parts of the dyestuff obtained by coupling diazotized aminobenzene-2-sulphonic acid with 5-pyrazolone-3-carboxylic acid are dissolved in 300 parts of concentrated sulphuric acid. 27 parts of N-methylol-$\alpha,\beta$-dibromopropionic acid amide are added to this solution at 15 to 25° C. and the batch is stirred for 24 hours at room temperature. It is then poured on to about 600 parts of ice, the dyestuff slurry is isolated by filtration and washed with a 15% sodium chloride solution. The dyestuff is stirred into 600 parts of ice water, the pH of the batch is adjusted to 12.0 with 30% sodium hydroxide solution, stirred for 30 minutes, between 0 and 10° C., the pH is adjusted to 7.0 with 30% hydrochloric acid, and the dyestuff is salted out with sodium chloride. It is isolated by filtration, washed with a 20% sodium chloride solution and dried in vacuo at 70 to 80° C.

A yellow powder is obtained which is soluble in water and which dyes wool and cotton yellow tints fast to wet treatments and to light.

EXAMPLE 2

30.4 parts of the dyestuff obtained by coupling diazotized aminobenzene-2-sulphonic acid with 3-methyl-5-pyrazolone are dissolved in 300 parts of concentrated sulphuric acid. 14 parts of N-methylolchloracetamide are added to the solution at 15 to 25° C. and the batch is stirred for 24 hours at room temperature. It is then poured on to about 600 parts of ice, the dyestuff slurry is isolated by filtration and then washed with a 15% sodium chloride solution until the washings run neutral. The dyestuff is stirred into 600 parts of water and the pH of the batch is adjusted to 7.0 with 30% sodium hydroxide solution, the dyestuff is salted out with sodium chloride, isolated by filtration, washed with a 15% sodium chloride solution and then dried in vacuo at 70 to 80° C.

A yellow powder is obtained which is soluble in water and which dyes wool and cotton yellow tints fast to wet treatments and to light.

EXAMPLE 3

A similar dyestuff is obtained by replacing the N-methylchloracetamide used in Example 2 with 29 parts of N-methylol-$\alpha,\beta$-dibromopropionamide.

EXAMPLE 4

62.4 parts of $\alpha,\beta$-dichloropropionic acid amide are dissolved in 420 parts of 100% sulphuric acid. 25.2 parts of dichlorodimethylether are added dropwise during two hours to the solution which has been cooled to 0 to 5° C., and the mixture is stirred for 16 hours at 10 to 15° C.

136 parts of the dyestuff obtained by coupling diazotized 4-acetylamino-1-aminobenzene-2-sulphonic acid with 3-methyl-5-pyrazolone are dissolved in 400 parts of 96% sulphuric acid. The solution described in the preceding paragraph is added dropwise during 30 minutes to the dyestuff solution and the batch is stirred for a further 24 hours at room temperature. It is then discharged on to about 2,000 parts of ice, the precipitated dyestuff slurry is isolated by filtration and then washed with a 15% sodium chloride solution. The dyestuff is stirred into 2,000 parts of water, the pH is adjusted to 7.0 with 30% sodium hydroxide solution, and the dyestuff is salted out with sodium chloride. It is isolated by filtration, washed with a 15% sodium chloride solution and dried in vacuo at 70 to 80° C. A water-soluble yellow powder is obtained which dyes wool and cotton yellow tints fast to wet treatments and to light.

Dyestuffs that dye wool and cotton the tints indicated in Column III of the following table are obtainable by condensing the dyestuffs listed in Column I with the N-methylolamides listed in Column II by the methods described in Examples 2 and 4.

| | I | II | III |
|---|---|---|---|
| 1 | (SO₃H, SO₃H)-C₆H₃-N=N-CH-C(=O)-NH-N=C(CH₃) (pyrazolone) | N-methylol-$\alpha,\beta$-dibromopropionic acid amide. | Yellow. |
| 2 | (COOH)-C₆H₄-N=N-CH-C(=O)-NH-N=C(CH₃) (pyrazolone) | ⎯⎯do⎯⎯ | Do. |
| 3 | CH₃CONH-C₆H₃(SO₃H)-N=N-CH-C(=O)-NH-N=C(CH₃) (pyrazolone) | ⎯⎯do⎯⎯ | Do. |

| | I | II | III |
|---|---|---|---|
| 4 | [structure: CH₃CONH-C₆H₃(SO₃H)-N=N-CH(C(CH₃)=N-NH-)C=O pyrazolone] | N-methylol-acrylic acid amide. | Do. |
| 5 | Same as above | N-methylol-β-chloropropionic acid amide. | Do. |
| 6 | [structure: naphthalene-1,5-disulfonic acid with -N=N-CH(C(CH₃)=N-NH-)C=O pyrazolone] | N-methylol-α,β-dibromopropionic acid amide. | Do. |
| 7 | [structure: benzothiazole (H₃C, SO₃H substituted) -C₆H₄-N=N-CH(C(COOH)=N-NH-)C=O] | do | Orange. |
| 8 | [structure: HO₃S-C₆H₄-N=N-C₆H₃(SO₃H)-N=N-CH(C(CH₃)=N-NH-)C=O] | do | Do. |
| 9 | [structure: bis-pyrazolone linked via tolidine disulfonic acid, symmetric with two CH₃ pyrazolone groups] | N-methylol-α,β-dibromopropionic acid amide (2 equivalents). | Yellow. |
| 10 | Same as above | N-methyl-acrylic acid amide (2 equivalents). | Do. |
| 11 | do | N-methylolchloroacetamide (2 equivalents). | Do. |
| 12 | do | N-chloromethyl-α,β-dichloropropionic acid amide (2 equivalents). | Do. |
| 13 | [structure: HO₃S, CH₃, H₃C, NHCOCH₃ substituted benzene -N=N-CH(C(CH₃)=N-NH-)C=O] | N-methylol-α,β-dibromopropionic acid amide. | Do. |

Dyeing prescription A 0.5 part of the dyestuff obtained in the manner described in Example 2 is dissolved in 4,000 parts of water; 10 parts of sodium sulphate crystals are added, and 100 parts of well-wetted wool are placed in the dyebath so prepared at 40 to 50° C. 2 parts of 40% acetic acid are added, the dyebath is brought to the boil in 30 minutes, and dyeing is carried out at the boil for three-quarters of an hour. Subsequently, the wool is rinsed with cold water and dried. A level yellow dyeing possesssing a good fastness to light and an excellent fastness to washing is obtained.

A level yellow dyeing possessing a good fastness to light and an excellent fastness to washing is also obtained when the same dyeing procedure is adopted but without the addition of acetic acid to the dyebath.

Dyeing prescription B 2 parts of the dyestuff obtained in the manner described in Example 1 are dissolved in 100 parts of water.

A cotton fabric is impregnated with this solution on a padding mangle, the fabric being squeezed in a manner such that it retains 75% of its dry weight of dyestuff solution.

The treated material is dried and then impregnated at room temperature with a solution containing 10 grams of sodium hydroxide and 300 grams of sodium chloride per litre, the material being squeezed in a manner such that it retains 75% of its dry weight of chemical solution; it is then steamed for 60 seconds, at 100 to 101° C., rinsed, treated in a 0.5% solution of sodium bicarbonate, rinsed, soaped at the boil in a 0.3% solution of a non-ionic detergent, rinsed and dried.

Dyeing prescription C 100 parts of wool knitting yarn are placed at 50 to 80° C. in a dyebath containing in 3,000 parts of water, 10 parts of sodium sulphate crystals, 6 parts of 40% acetic acid, 0.5 part of the addition product of oleylamine and ethylene oxide, as described below, and 2 parts of dyestuff No. 6 of the table in Example 4. The dyebath is brought to the boil in 30 minutes, and dyeing is carried out for one hour at the boil. The wool is then rinsed and dried.

Preparation of the ethylene oxide addition product 1 part of finely divided sodium is added to 100 parts of commercial oleylamine, the batch is heated to 140° C. and ethylene oxide is introduced at 135 to 140° C. As soon as the ethylene oxide is absorbed rapidly the reaction temperature is lowered to 120 to 125° C. and the introduction of ethylene oxide is continued until 113 parts have been absorbed. The reaction product so obtained gives a practically clear solution in water.

Printing description 2 parts of dyestuff No. 1 of the table in Example 4 are admixed with 20 parts of urea, the mixture is dissolved in 28 parts of water and the solution is stirred into 40 parts of a 5% sodium alginate thickener. 10 parts of a 10% sodium carbonate solution are then added.

A cotton fabric is printed with this printing paste on a roller printing machine, dried, and then steamed for 8 minutes in saturated steam at 100° C. The printed fabric is then thoroughly rinsed in cold and hot water and then dried.

A yellow print fast to washing at the boil is obtained.

What is claimed is:

1. An azo dyestuff free from heavy metal of the formula

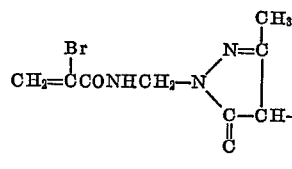

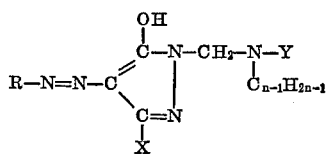

in which R is the radical of an aromatic carbocyclic or triazolyl diazo component containing an azo group, said diazo component containing a sulphonic acid group or a carboxylic acid group, X is a member selected from the group consisting of the lower alkyl, carboxyl, phenyl and carbonamide groups, Y represents an aliphatic fibre-reactive linear acyl residue of up to 3 carbon atoms and $n$ is a positive integer not greater than 7.

2. A monoazo dyestuff of the formula

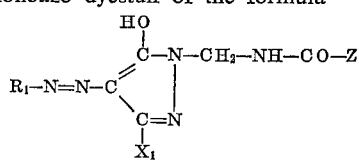

in which Z represents a member selected from the group consisting of the chloroacetyl, mono- and di-chloro-propionyl, mono- and di-bromopropionyl, acrylic, chloracrylic, bromacrylic and chlorocrotonyl groups, $R_1$ represents a member selected from the group consisting of sulphophenyl and sulphonaphthyl and $X_1$ represents a member selected from the group consisting of the methyl and carboxyl groups.

3. The dyestuff of the formula

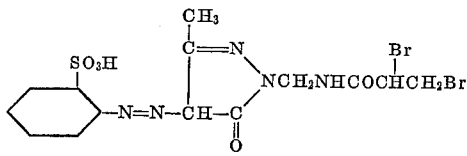

4. The dyestuff of the formula

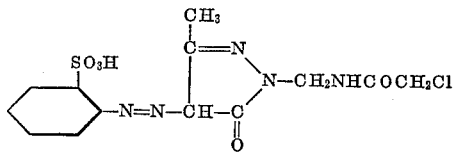

5. The dyestuff of the formula

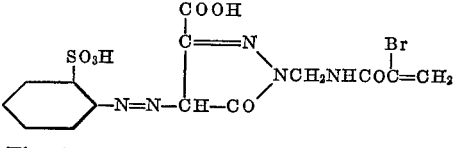

6. The dyestuff of the formula

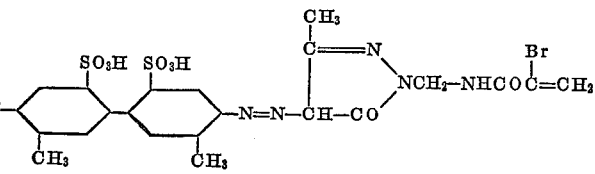

7. The dyestuff of the formula

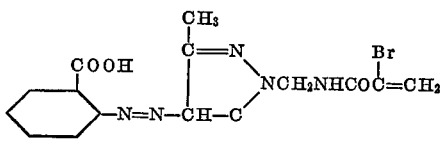

References Cited

UNITED STATES PATENTS 3,324,105   6/1967   Hanke et al. _____ 260—158

CHARLES B. PARKER, *Primary Examiner.*

DONALD M. PAPUGA, *Assistant Examiner.*

U.S. Cl. X.R.

8—13, 41, 55; 260—37, 158, 162, 163, 310